J. W. MENHALL AND C. G. CLEMENT.
VEHICLE COUPLING.
APPLICATION FILED JUNE 3, 1918.
1,304,695.
Patented May 27, 1919.
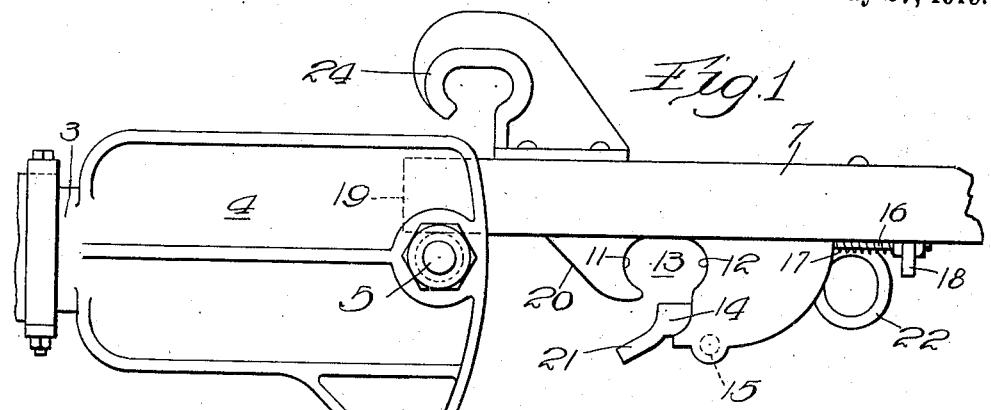
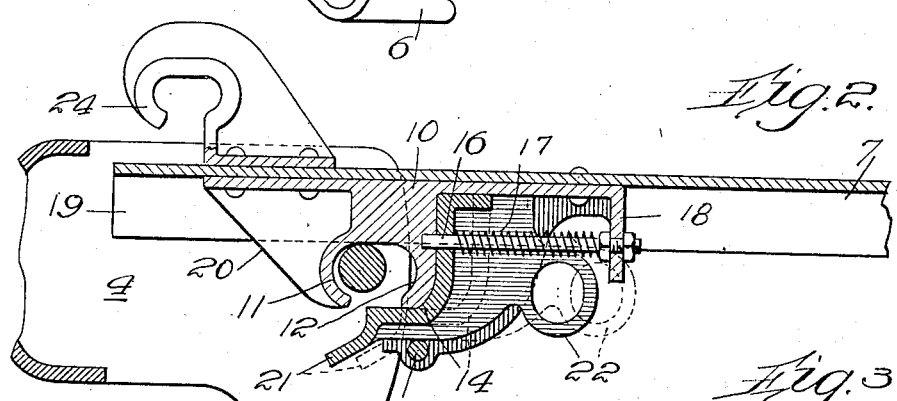
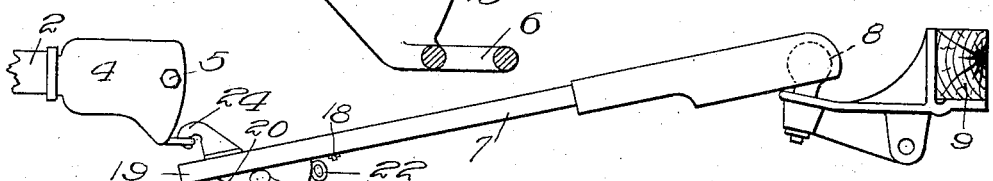
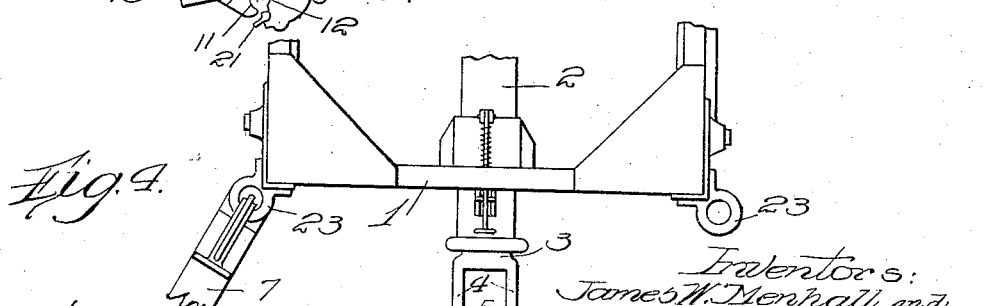

UNITED STATES PATENT OFFICE.

JAMES W. MENHALL AND CHARLES G. CLEMENT, OF EDGERTON, WISCONSIN, ASSIGNORS TO HIGHWAY TRAILER COMPANY, OF EDGERTON, WISCONSIN, A CORPORATION OF WISCONSIN.

VEHICLE-COUPLING.

1,304,695.

Specification of Letters Patent.   Patented May 27, 1919.

Original application filed February 11, 1918, Serial No. 216,655. Divided and this application filed June 3, 1918. Serial No. 237,950.

*To all whom it may concern:*

Be it known that we, JAMES W. MENHALL and CHARLES G. CLEMENT, residing at Edgerton, in the county of Rock and the State of Wisconsin, have invented certain new and useful Improvements in Vehicle-Couplings, of which the following is a specification, reference being had to the accompanying drawings, forming a part thereof.

This application is a division of our pending application Serial No. 216,655, filed February 11, 1918, and relates to coupling connections for a trailer vehicle. It may be understood that the vehicle for which these coupling devices are designed is a complete self-supporting vehicle as of the four-wheeled type, certain wheels being mounted for steering and a draw-bar being provided with steering connections to such wheels so that by suitably rigid connection of the draw-bar to a draft pole or other tractive member extending from a tractor vehicle, the trailer will not only be drawn by the tractor but its direction of travel will be controlled. This and other features of the invention are hereinafter described and shown in the drawings, being more particularly indicated by the claims.

In the drawings:

Figure 1 is a side elevation of a trailer coupler and a draft pole with coupling connections arranged in the initial position ready for coupling engagement.

Fig. 2 is a vertical section of the parts shown in Fig. 1, but showing said parts in fully coupled relation.

Fig. 3 is a side elevation on a reduced scale, showing a draft pole and coupler connected by auxiliary coupling devices thereon.

Fig. 4 is a fragmentary plan view of the end portion of a trailer vehicle frame illustrating the connection of a draft pole thereto by means of auxiliary coupling connections.

In Fig. 4 of the drawings there is shown a portion of the frame, 1, of the trailer vehicle provided with a draw-bar, 2, which is fitted with a coupler, 3, embodying this invention. The coupler, 3, is formed with two parallel walls or cheeks, 4, horizontally spaced apart and connected by a cross-bolt, 5, near their forward ends for engagement with a coupling device on the draft pole of the tractor vehicle. Said side walls are also connected at a point below the cross-bolt, 5, by a draft ring, 6, whose purpose will be later explained.

The draft pole, 7, is shown as a channel member opening downwardly, and provided at its forward end with means for engaging a spherically formed coupling hook member, 8, secured to the rear portion, 9, of the hauling vehicle, as more particularly described in our pending application, Serial No. 190,479. A short distance back from the rear end of the draft pole, 7, there is secured, as shown in Fig. 2, a fitting, 10, formed with oppositely facing hook-shaped portions, 11 and 12, which combine to form a slot, 13, whose width in vertical direction is substantially equal to the diameter of the cross bolt, 5, and whose length in horizontal direction is considerably greater than that diameter, while the opening between the terminals of hooks, 11 and 12, at the lower side of the slot, 13, is just enough greater than the diameter of said bolt, 5, to permit easy entrance of the latter into the slot. This opening is controlled by a slidable latch member, 14, guided for movement upon a cross pin, 15, and between the lateral flanges of the hooked portion, 12, which flanges said cross pin, 15, connects, and further guided by slidable engagement with a guide rod, 16, which carries a coiled spring, 17, reacting between said latch member, 14, and a fixed bracket, 18, which is an integral part of the fitting, 10.

To operate the coupler the draw bar, 2, on the trailer vehicle, and the draft pole, 7, of the hauling vehicle are arranged substantially in alinement with the extreme end portions, 19, of said draft pole, resting upon the cross bolt, 5, between the cheeks or flanges, 4, of the trailer coupler. The hauling vehicle is then backed toward the trailer vehicle, whereupon the end, 19, of the draft pole, 7, is further entered between said cheeks, 4, the inclined back, 20, of the hook, 11, riding up on the cross bolt, 5, causing the end portion of the depending lip, 21, of latch, 14, to strike said bolt, 38. By further backing movement, said latch member, 14, is forced back against the spring, 17, out of its position guarding the entrance to slot, 13, and by gravity, the draft pole, 7, drops into position shown in Fig. 2 with said slot, 13, accommodating and engaging the cross bolt, 5. The pressure of spring 17, then snaps the latch, 14, back to its position for substantially closing the lower side of slot, 13, thus preventing accidental disengagement of the parts and adapting the draft pole, 7, to transmit either a thrust through the hook portion, 12, or a pull through the hook portion, 11, to the cross bolt, 5, and thus to the trailer vehicle. It may be understood that the distance between the cheeks or flanges, 4, is substantially equal to the width of the draft pole, 7, so that when the parts are engaged as shown in Fig. 2, said draft pole and the draw bar, 2, will remain in fairly accurate alinement, and the draw bar will at all times assume the same direction as the draft pole, 7, resulting in the correct steering movement being transmitted to the road wheels. Disengagement of the coupler is very simply effected by inserting one or two fingers in the ring or handle, 22, for retracting the latch member, 14, to permit lifting the draft pole out of its position between the flanges, 4, of the coupler.

In shunting a trailer vehicle about in relatively close quarters, it is sometimes undesirable or impossible for the motor truck to assume such a position that the regular coupler may be employed. Under such conditions it is often convenient to be able to attach the motor truck to a corner of the trailer vehicle frame, and for this purpose each corner of said frame is fitted with an eye, 23, and the top side of the draft pole near its terminal portion, 19, is provided with a hook, 24, adapted to engage such eye, 23, as a temporary connection in a special situation. The coupler flanges, 4, are also provided with the eye, 6, which may be similarly engaged by the hook, 24, of the draft pole, 7, especially in situations where it is preferred not to have the draft pole and the draw bar in alinement, as for example, where the motor truck would run for a short distance in the direction transverse to the longitudinal axis of the trailer in the latter's initial position, but for the purpose of effecting a short turn or otherwise altering the position of the trailer vehicle. Fig. 3 illustrates this latter use of the draft pole, while its connection to one of the corner rings, 23, is shown in Fig. 4.

We claim:—

1. In a trailer vehicle provided with a draw bar, a coupler thereon having laterally spaced vertical walls and a transverse element connecting said walls, together with a draft pole dimensioned to lie between said walls upon said connecting element and provided with depending abutments before and behind said connector, together with a latch member movable past one abutment toward the other under said connector to retain the draft pole in such engagement.

2. In the combination recited by claim 1 foregoing, means for manually withdrawing said latch disposed at a part of the draft pole outside said walls of the draw bar coupler.

3. In combination with a coupler comprising transversely spaced vertical walls and a connector extending between them, a draft pole dimensioned to lie between said walls upon said connector and having depending abutments longitudinally spaced to admit the said connector between them, said abutments being set back from the end of the draft pole to permit lodgment of the terminal portion thereof upon the connector preparatory to engaging the latter between said abutments.

4. In the combination set forth in claim 3, a guide lip depending from the forward abutment adjusted to collide with the connector when the pole is backed into the coupler for leading said connector into place between the two abutments.

5. In the combination recited by claim 4 foregoing, means adapted for yieldingly retaining said latch member in position to substantially block the exit of the coupler connector from its position between the two abutments of the draft pole.

6. In the construction defined in claim 3 foregoing, a latch member and means for holding it yieldingly in position to block the exit of the coupler connector from between the abutments, the guide lip being depending from said latch member; whereby the encounter of said lip by the coupler connector forces back the yieldingly-held latch member to permit the entrance of the connector between the abutments, and the latch member is thereafter yieldingly returned to locking position.

In testimony whereof, we have hereunto set our hands at Edgerton, Wisconsin, this 25th day of May, 1918.

JAMES W. MENHALL.
CHARLES G. CLEMENT.

Copies of this patent may be obtained for five cents each, by addressing the "Commissioner of Patents, Washington, D. C."